Dec. 31, 1935.  A. E. SPARLING  2,026,327
HOSE REEL
Filed Dec. 19, 1933   2 Sheets-Sheet 2
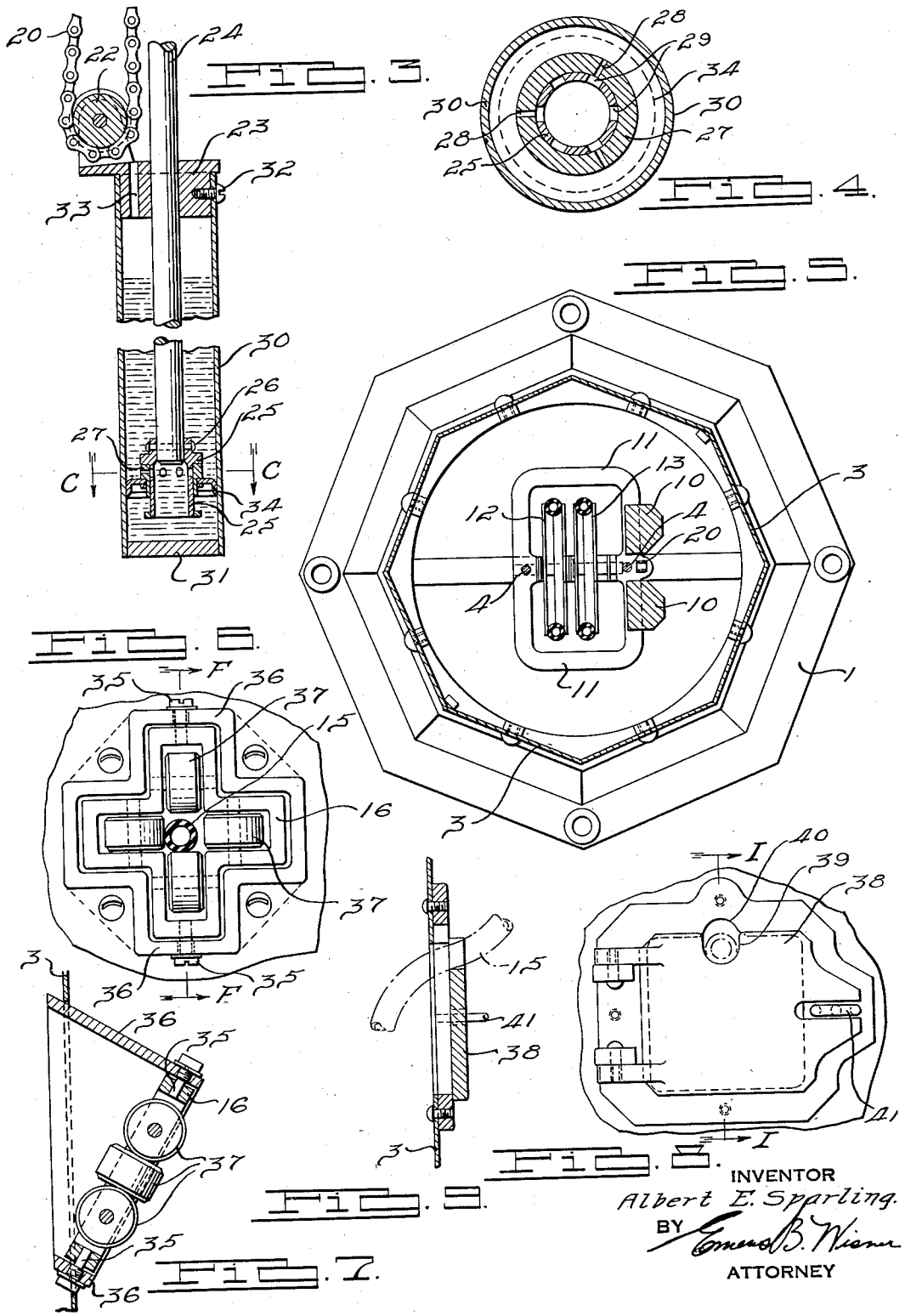
INVENTOR
Albert E. Sparling.
BY
ATTORNEY Patented Dec. 31, 1935

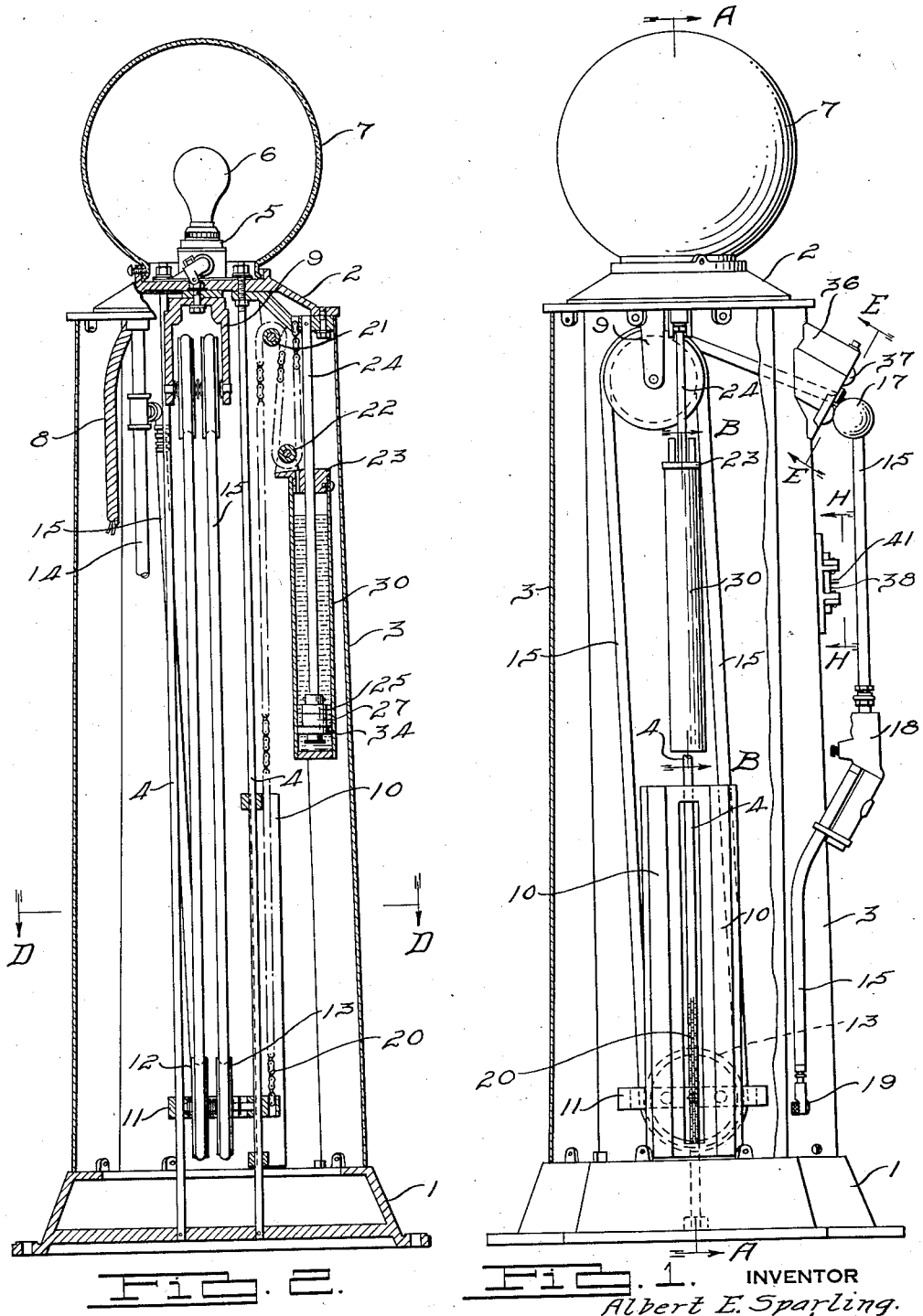

2,026,327

UNITED STATES PATENT OFFICE 2,026,327

HOSE REEL

Albert E. Sparling, Detroit, Mich.

Application December 19, 1933, Serial No. 703,104

2 Claims. (Cl. 299—77)

This invention relates to hose reels and particularly to a hose reel to carry the air hose for filling automobile tires.

Another object of the invention is to provide a hose reel in which the hose may be drawn out quite rapidly but will be automatically returned to the housing slowly at a predetermined speed to prevent kinking of the hose as it is returned to the housing.

Another object of the invention is to provide a hose reel in which a weight is utilized to return the hose to the housing and the speed of movement of the weight is controlled by means of a cylinder and piston.

Another object of the invention is to provide a hose reel housing having a pivoted roller plate through which the hose travels and arranged to prevent kinking of the hose.

These objects and the several novel features of the invention are hereinafter more fully described and claimed and the preferred form of construction by which these objects are attained is shown in the accompanying drawings in which—

Fig. 1 is a side elevation of the device with one of the side plates removed.

Fig. 2 is a section taken on line A—A of Fig. 1.

Fig. 3 is an enlarged section taken on line B—B of Fig. 1.

Fig. 4 is an enlarged section taken on line C—C of Fig. 3.

Fig. 5 is an enlarged section taken on line D—D of Fig. 2.

Fig. 6 is an enlarged section taken on line E—E of Fig. 1.

Fig. 7 is a section taken on line F—F of Fig. 6.

Fig. 8 is an enlarged section taken on line H—H of Fig. 1.

Fig. 9 is a section taken on line I—I of Fig. 8.

As shown in Figs. 1, 2, and 5, the device comprises a base 1 and a cap member 2 connected together by the panels 3. The members 1 and 2 are also connected by means of a pair of guide rods 4. Mounted on the cap member 2 is an electric socket 5 carrying an electric light bulb 6 and a globe 7 is provided about the electric light bulb. The wires for the electric light bulb are carried through a conduit 8 which is standard practice. Supported on the underside of the cap member 2 is a pulley block 9 carrying a pair of pulleys, as shown. Slidably mounted on one of the guide rods 4 is a weight 10, shown in Figs. 1, 2, and 5, and this weight is provided with a horizontal frame 11 in which a pair of pulleys 12 and 13 are rotatably mounted, as will be understood from Fig. 5. The opposite side of this frame rides on the other guide rod 4, as shown. A compressed air pipe 14 is provided, as shown in Fig. 2, which leads from a suitable source of supply and a hose 15 is connected to this pipe and leads about the pulley 12 and thence about one of the pulleys in the pulley block 9 and back to the pulley 13 and thence about the other pulley in the pulley block 9 from which the hose extends through the roller block 16, as shown in Fig. 6. A rubber ball 17 is provided on the hose 15 and the hose leads to an air gage 18 and thence to a terminal end 19 which may be fitted over the valve stem of a tire. A chain 20 is connected to the frame 11, as shown in Figs. 2 and 5, and this chain leads over a roller 21 supported on the underside of the cap 2 and thence about a roller 22 which is rotatably mounted on the cylinder cap 23 and the chain leads from the roller 22 and is secured to the cap 2, as shown in Fig. 2. A piston rod 24 is secured in the cap 2 and extends downwardly therefrom and is provided with a valve member 25 secured to the lower end thereof by the pin 26.

This valve member fits within a second valve member 27, shown more particularly in Fig. 4, and this second valve member is provided with three by-pass apertures 28 which may be brought to alignment with the apertures 29 in the member 25. The member 27 is slidable longitudinally of the member 25 and is provided with a leather cup washer 34 which rides in contact with the wall of the cylinder 30. This cylinder 30 is provided with a plug 31 in the bottom thereof and at the top is provided with the cap member 23 which is held in place with the screw 32. This cap member 23 is provided with a vent 33 and the cylinder is filled with oil to about the point shown in Figs. 2 and 3.

In use, the operator grasps the air gage 18 or end 19 of the hose and draws it outwardly by means of the pulleys. This raises the weight on the guide rods 4 in proportion to the extent that the hose is pulled out. As the weight 10 moves upwardly, slack is provided in the chain 20 and this is taken up by the weight of the cylinder 30 which moves downwardly by gravity. In fact, the cylinder may be weighted, if desired, but it is important that the combined weight of the cylinder and the weight be less than the weight 10 and the lower pulley frame. As the cylinder moves downwardly, the valve member 27 is moved downwardly therewith due to the contact between the washer 34 and the cylinder. This downward movement of the valve member 27 uncovers the six apertures 29 in the valve member 25 which allows the oil in the cylinder to pass through the apertures 29 and into the lower portion of the cylinder. When the operator is through with the hose, he simply lets go of it at which time, the weight 19 tends to move downwardly by gravity thus lengthening the space between the upper and lower pulleys and pulling the hose back into the housing.

The object of the cylinder is to prevent too rapid return of the hose into the housing and as the weight 19 moves downwardly the chain 20 is drawn taut and begins to draw the cylinder upwardly. The first upward movement of the cylinder carries the valve member 27 upwardly therewith and brings the bleeder apertures 28 into alignment with the apertures 29 in the valve member 25. This restricts upward flow of the oil so that the oil must pass upwardly through the apertures 29 and through the apertures 28 into the upper part of the cylinder. This hole is made of sufficient sizes in relation to the viscosity of the oil in the cylinder so as to retard this upward movement and allow a slow and gradual return movement of the hose into the housing. This gradual return movement of the hose prevents the hose from kinking or whipping around and the hose continues the gradual return to the housing until the rubber ball 17 engages the roller plate 16.

This roller plate 16, as shown in Fig. 7, is mounted on two pivot pins 35 and is set at an angle in a frame 36 which is attached to the side of the housing. In this manner, the plate 16 may turn on the pivots 35 to accommodate itself to the position of the hose. This plate 16 also carries four rollers 37 against the outer surfaces of which the hose may ride, as will be understood from Fig. 6, and these rollers, in combination with the angle of the plate and its pivoting action, absolutely prevent kinking of the hose.

As shown in Figs. 1, 8, and 9, a door 38 is provided on the side of the housing having a notch 39 therein and a notch 40 is also provided in the door frame. This door may be opened and the end of the hose inserted therethrough and the air gage 18 may also be positioned within the housing with the hose 15 extending through the two notches 39 and 40. The door, when closed, may be then locked in position by inserting a padlock through the hasp 41. This prevents theft of the air gage and also prevents use of the hose when the attendant is absent.

If desired, the pulleys on which the hose is wound may be provided with pulley guards and the device may be utilized to provide a control for other things than hose such, for instance, as electric light cords or other flexible conduits.

From the foregoing description it becomes evident that the device is very simple and efficient in operation, will not easily get out of order, provides a slow and gradual return of the hose and prevents possibility of the hose becoming kinked.

Having thus fully described my invention, its utility and mode of operation, what I claim and desire to secure by Letters Patent of the United States is—

1. In a hose reel, a housing, a pair of pulleys rotatably mounted in the top of the housing, a pair of vertical guide rods in the housing, a weight slidably mounted on the vertical guide rods, a pair of pulleys carried by the weight, a hose extending from a source of supply and about one of the pulleys on the weight, thence about one of the pulleys in the top of the housing and about the other pulley on the weight and thence about the other pulley in the top of the housing, the housing being provided with an angular extension at one side, a plate pivotally mounted in said angular extension, a series of rollers rotatably mounted in the plate and arranged to provide a central opening therebetween, the end of the hose extending through said central opening and the plate being free to turn upon angular movement of the hose, a piston stationarily mounted on the housing, a cylinder slidable on the piston and tending to move downwardly thereon by gravity, a roller rotatably mounted on the cylinder, a second roller rotatably mounted on the upper portion of the housing, a chain secured to the housing and to the weight and extending about the cylinder and housing rollers without any slack, the aforesaid cylinder containing liquid and the piston being constructed and arranged in said cylinder to act with said liquid to allow a rapid downward movement of the cylinder and retarding upward movement thereof, the arrangement being such that downward movement of the weight moves the cylinder upwardly on the piston by means of the chain.

2. In a hose reel, a housing, a pair of pulleys rotatably mounted in the top of the housing, a pair of vertical guide rods in the housing, a weight slidably mounted on the vertical guide rods, a pair of pulleys carried by the weight, a hose extending from a source of supply and about one of the pulleys on the weight, thence about one of the pulleys in the top of the housing and about the other pulley on the weight and thence about the other pulley in the top of the housing, the end of the hose extending from the housing, a piston stationarily mounted on the housing, a cylinder slidable on the piston and tending to move downwardly thereon by gravity, a roller rotatably mounted on the cylinder, a second roller rotatably mounted on the upper portion of the housing, a chain secured to the housing and to the weight and extending about the cylinder and housing rollers without any slack, the aforesaid cylinder containing liquid and the piston being constructed and arranged in said cylinder to act with said liquid to allow a rapid downward movement of the cylinder and retarding upward movement thereof, the arrangement being such that downward movement of the weight moves the cylinder upwardly on the piston by means of the chain.

ALBERT E. SPARLING.